Figure 1:
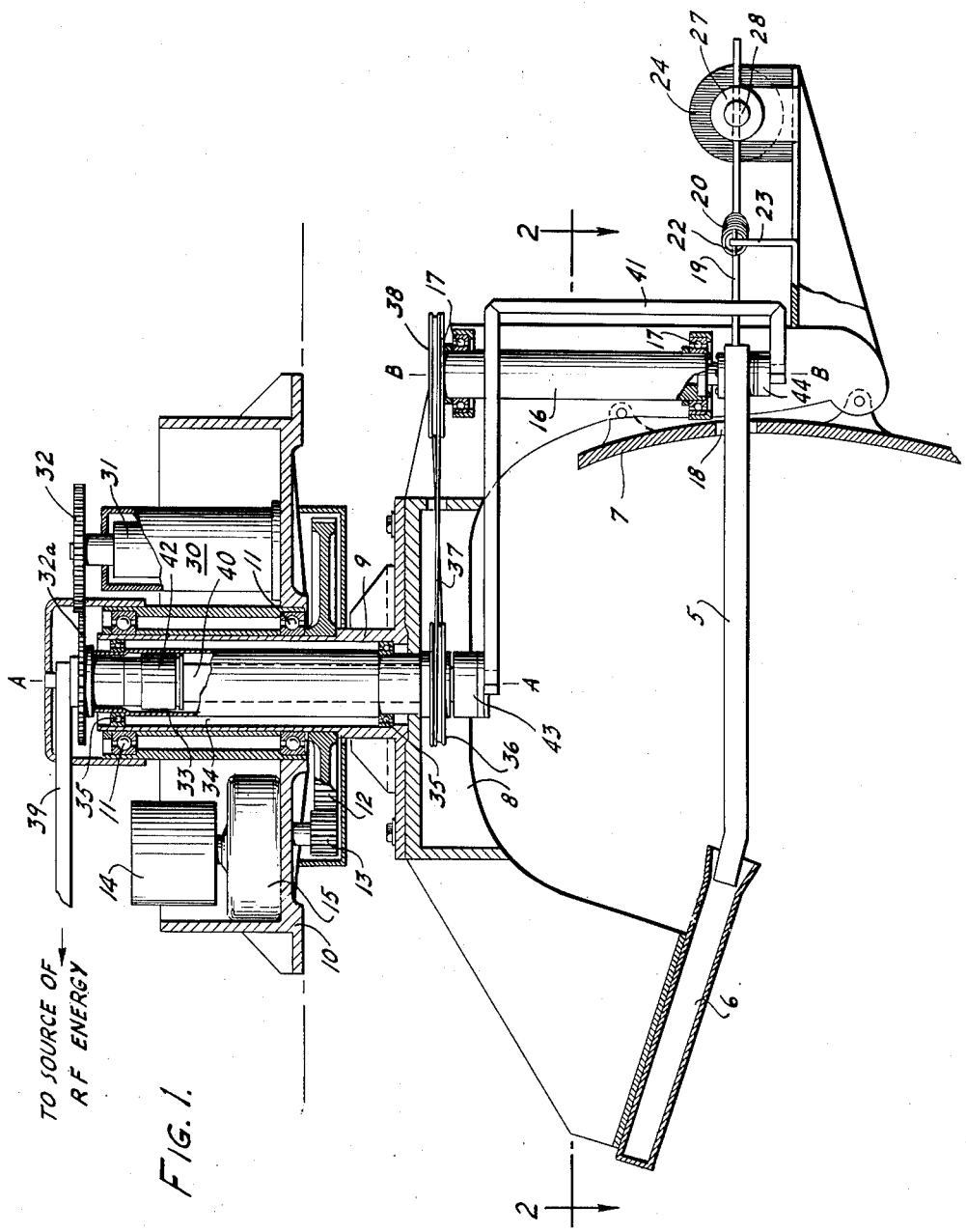

Jan. 4, 1955  F. R. FARROW, JR., ET AL  2,698,902
SCANNING APPARATUS

Filed Nov. 17, 1948  2 Sheets-Sheet 1

INVENTORS
*FREDERICK R. FARROW Jr.*
*AND NORMAN O. BENDER Jr.*
BY
*Brown, Denk & Synnestvedt*
AGENTS INVENTORS
FREDERICK R. FARROW Jr.
AND NORMAN O. BENDER Jr.
BY
Brown, Jenk & Synnestvedt
AGENTS 2,698,902
Patented Jan. 4, 1955

2,698,902

SCANNING APPARATUS

Frederick R. Farrow, Jr., Audubon, and Norman O. Bender, Jr., Runnemede, N. J., assignors to Philco Corporation, Philadelphia, Pa., a corporation of Pennsylvania Application November 17, 1948, Serial No. 60,524

3 Claims. (Cl. 250—33.65)

The present invention relates to scanning apparatus and, particularly, to the scanning antenna apparatus for radar equipment which functions to radiate and to direct pulses of radio frequency energy to be reflected by objects or targets to be detected. Specifically, the invention has to do with mechanism adapted to improve the scanning motion of the antenna and to operate the indicator control in synchronism with this improved motion.

Usually, the antenna may be operated either for slow scanning or for rapid scanning. Slow scanning has the advantage that its effective range is considerably greater than the effective range of rapid scanning. This is due to the fact that, for slow scanning operation, the rate of movement of the antenna, through its path of travel, is such that distantly reflected pulses have time to reach the antenna before the latter moves out of the line of such pulses. Slow scanning, however, has the disadvantage that distant objects or targets indicated, for instance, on the screen of a cathode ray tube, cannot be observed with clarity. This results from the fact that the apparatus affords only one "look" per scanning cycle, and the visual indication fades before the antenna can again pick up the distant objects or targets and re-indicate them on the indicator screen.

While rapid scanning has the disadvantage of a shorter range, because the antenna moves too fast to receive distantly reflected pulses, it, nevertheless, has the advantage of affording clear observation of the objects or targets which are detected at close range. This is because rapid scanning provides more "looks" per unit of time and, therefore, the reappearance of detected objects or targets occurs before the previous indication has time to fade from the viewing screen.

It is, therefore, the primary object of this invention to provide a scanning arrangement which eliminates the disadvantages and preserves the advantages of both slow and rapid scanning operations. To that end, the invention provides an antenna structure adapted to spin at slow speed and including means effective to provide for repeated "looks," in rapid succession, at the objects or targets, while the antenna structure continues through its cyclic scanning at slow spinning speed.

Another object of the invention is to provide an antenna apparatus by means of which clear observation of detected objects or targets is assured, whether said objects or targets are within short range or long range of the apparatus. For that purpose, the invention employs means providing for a slow primary scan through a circle or an arc and, in addition, providing for a rapid secondary scan through a sector of said circle or arc.

Still another object of the invention resides in the provision of a scanning apparatus by means of which a radiated and directed beam of radiant energy slowly sweeps through a circle or an arc and, at the same time, rapidly oscillates through sectors of said circle or arc. This object of the invention is realized by providing a rotatable scanning antenna including a pivotally mounted member for feeding radiant energy, and by incorporating this member in a mechanical resonant system adapted to resonate at the desired frequency to impart vibratory motion to said member as it moves through the circle or arc described by the scanning antenna in its rotating movement.

It is, also, an important feature of the invention to provide an arrangement whereby data derived from superimposed rotary and vibratory scanning motions may be properly and readily applied to the indicator by means of a simple mechanism. According to this feature of the invention, the arrangement is such that a single control is required to maintain the indicating means, such as the beam of a cathode ray tube, in synchronism with the motions of the antenna.

Figure 2:
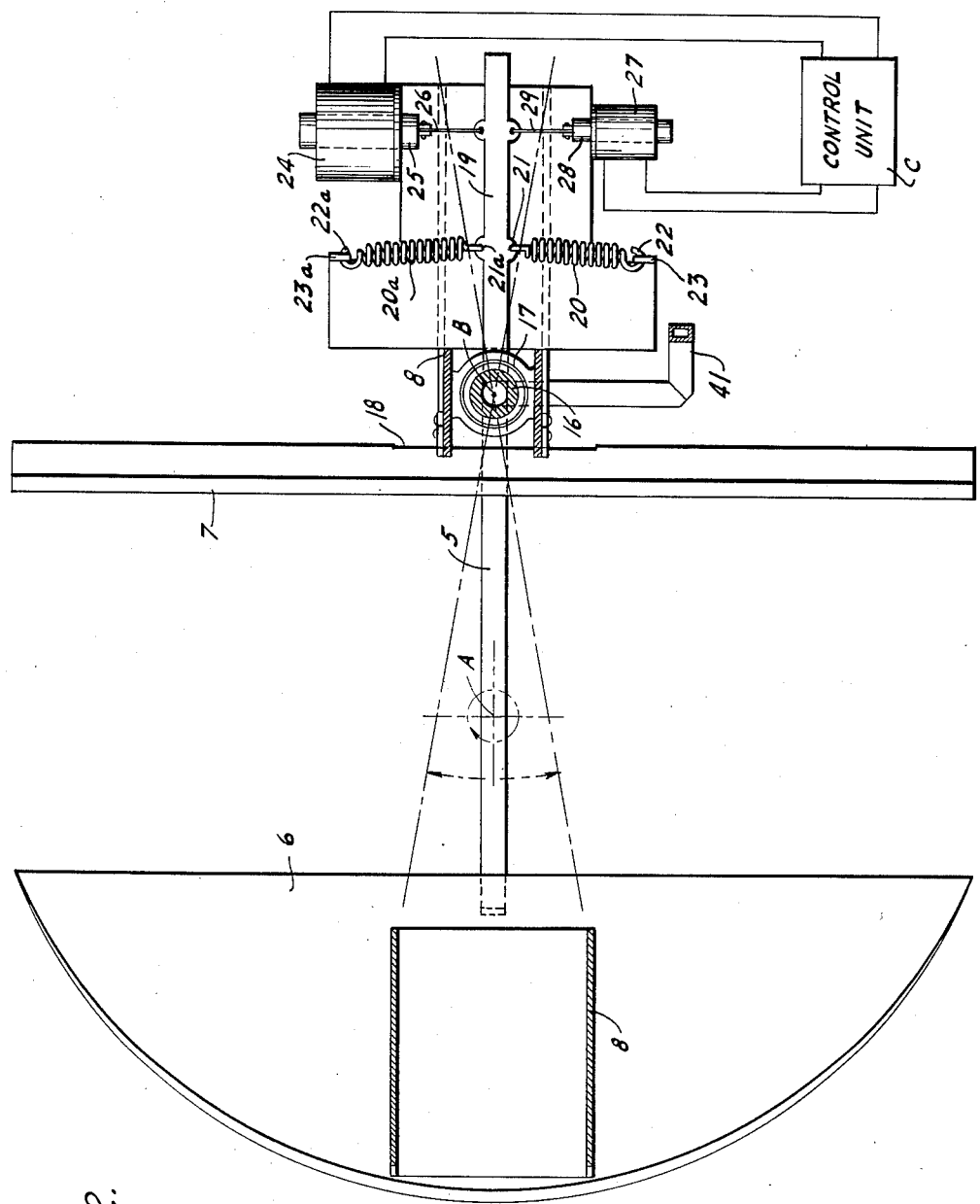

These and other objects of the invention, and the manner in which they are obtained, will be fully understood from the following description based on the accompanying drawings which illustrate a preferred embodiment of the invention, and in which:

Figure 1 is elevational sectional view of the mechanism constructed in accordance with the invention; and Figure 2 is sectional view taken substantially on line 2—2 of Figure 1 and schematically illustrating the operation of the scanning antenna apparatus.

With more particular reference to the drawings, the scanning antenna apparatus, as shown, includes a beam radiating and directing system which essentially comprises a radiant energy feeding member 5, a pill-box radiator 6 and a reflecting radiator 7. The member 5 and radiators 6 and 7 are conveniently mounted on a suitable framework 8 which is adapted to rotate about a main axis A—A. Moreover, the radiant energy feeding member is constructed and arranged to oscillate about an auxiliary axis B—B which extends in substantially parallel relationship to the main axis A—A.

In order to provide for rotational movement of the scanning antenna about the main axis A—A, the framework, as shown, includes a shaft 9, which shaft is rotatably mounted in a stationary support 10, by means of ball-bearings 11. A gear 12 is rigidly affixed on said shaft and is disposed for engagement with a pinion 13 which is operatively connected with a suitable motor 14, through a suitable speed reducing device 15. Because of this construction, it will be understood that upon operation of the motor, the radiant energy feeding member and associated radiators, all of which are mounted on framework 8, are caused to rotate as a unit about the main axis A—A.

In order to provide for oscillatory movement of the radiant energy feeding member 5 about the auxiliary axis B—B, the member, as shown, is fixedly connected with a shaft 16, which shaft is rotatably supported on the framework, by means of ball-bearings 17. As illustrated in the drawings, the shaft 16, which is adapted to rotate about auxiliary axis B—B, is disposed rearwardly of the reflecting radiator 7 and is located substantially mid-way of the length of the latter, and the energy feeding end portion of member 5 projects through a slot 18 in said reflecting radiator. The mentioned end portion of member 5 extends in cooperative relation with the opened side of pill-box reflector 6, which is disposed forwardly of the reflecting radiator. The remaining end portion of member 5 is provided with an extension 19 which projects rearwardly of axis B—B, and which is adapted for connection with driving means now to be described.

In accordance with this invention, the driving means for imparting oscillatory motion to the radiant energy feeding member, consists of a mechanical resonant system of which said member is a part. As best seen in Figure 2, this resonant system includes a pair of diametrically opposed coil springs 20 and 20a which are attached, as at 21 and 21a, to extension 19 of member 5, and which are connected, as at 22 and 22a, to brackets 23 and 23a, one on each side of said member and both suitably arranged on the framework. The tension of the springs is so adjusted with respect to the mass of the entire system, that a condition of true mechanical resonance exists, and the construction and arrangement of the springs are such that they cooperate to impart to member 5 an oscillatory or substantially simple harmonic motion of the desired frequency. As a result, the energy feeding member 5 is caused to vibrate about auxiliary axis B—B while said member rotates with the framework 8 about the main axis A—A.

Suitable means is employed for the purpose of supplying the necessary impulses to effect constant and uniform vibratory or limited reciprocatory movement of the resonating system. Such means is shown in the drawings as a solenoid coil 24, having its plunger 25 connected to extension 19 of member 5, through a pivotal link 26, and electrically associated, through a suitable control unit C, with a trigger coil 27 which has its core 28 also connected with said extension, through a pivotal link 29. The solenoid coil 24 functions to build up the oscillations of the radiant energy feeding member to the desired amplitude, and to continue to supply the energy necessary to overcome windage and friction. The trigger coil 27 is adapted to pulsate in phase with the vibrations of the mechanical resonant system and to excite the control unit which generates and supplies electric current to the coil 24 in such a manner as to provide phased pulses of energy to said system at its resonant frequency.

The antenna apparatus so far described, operates in such a manner that the radiant energy feeding member 5 and associated reflectors 6 and 7 rotate in a plane generally perpendicular to rotational axis A—A and, at the same time, the member 5 is caused to vibrate in said plane. Thus, the apparatus provides a primary scan which corresponds to the rotational displacement and speed of the framework, and to superimpose upon said primary scan, a secondary scan which corresponds to the vibrational displacement and speed of member 5 in the mechanical resonant system. As a result of this operation, it is possible to obtain rapid scanning with a slowly rotating beam.

In accordance with the present invention, the apparatus is further adapted to supply, to the usual indicator (not shown), the data which is derived from the above-described two superimposed scanning operations. In order that the derived data may be properly utilized, the invention provides simplified means whereby the visual indications given by the indicator are accurately synchronized with the motions of the antenna. For that purpose, a self-synchronous motor 30 (Figure 1) is used. This motor includes an adjustable element in the form of a rotor 31, which is adapted to move in conformity with the movement of the scanning antenna. Since the mechanism, in accordance with the present invention, is adapted to impart superimposed rotary and vibratory motions to the scanning antenna, the rotor 31 is so connected with said antenna as to partake of both of said rotary and the vibratory motions.

As shown in the drawings, the means employed for that purpose include a gear 32 provided on the rotor and enmeshed with a gear 32a which is mounted on a shaft having the form of a torque tube 33. This tube extends through a bore 34 provided centrally of frame-supporting shaft 9, and is adapted to rotate with and in relation to said shaft, as will be hereinafter described. The shaft or torque tube 33 is supported concentrically of shaft 9, by means of ball-bearings 35, and is provided with a pulley 36. This pulley is suitably connected, by means of a cable or belt 37, to a second pulley 38 which is affixed to the shaft 16 of radiant energy feeding member 5. In practice, the shaft 16 takes the form of a torque tube similar to torque tube 33. Because of the pulley-and-belt driving connection between the shaft or torque tube 16 and the shaft or torque tube 33, the latter will oscillate about the main axis A—A in response to oscillations of torque tube or shaft 16 about auxiliary axis B—B, and because of the geared connection between torque tube 33 and rotor 31, the latter will, in turn, oscillate about its axis in response to oscillations of said torque tube 33 about main axis A—A. Also, because torque tube 33 is carried by shaft 9 of the framework which supports the torque tube or shaft 16 of radiant energy feeding member 5, said torque tube 33 will rotate about the main axis A—A with the shaft 9 and, therefore, the rotor 31 will also rotate about its axis in response to rotation of said shaft 9 about main axis A—A.

From the foregoing description, it will be appreciated that the apparatus, when in use, makes it possible to scan a sector which, in effect, slowly moves in a circle or arc, and that clear observation of objects or targets at long range is insured by providing for rapidly repeated "looks" as the antenna progresses through one of its scanning cycles. For example, assuming that it is desired to provide an apparatus in which the scanning antenna is so rotated as to obtain a scan of 360 degrees at 6 R. P. M., such an apparatus would normally afford one "look" for each revolution of the scanning unit, or six "looks" per minute. However, by employing a mechanism in accordance with the invention, thus number of "looks" per unit of time is greatly increased. For instance, the mechanical resonant system may be devised to effect oscillation of the radiant energy feeding member in such a manner as to obtain a secondary scan of a sector, 10 degrees wide at 15 cycles per second or thirty "looks" per second.

As shown in Figure 1, the radiant energy feeding member 5 communicates with a source of RF energy through wave guide sections 39, 40 and 41. In order to provide for free rotation of the scanning antenna apparatus about axis A—A, and for free oscillatory movement of the radiant energy feeding member about axis B—B, these wave guide sections are conveniently interconnected by means of suitable rotary joints 42, 43 and 44, and wave guide section 40 is disposed coaxially of rotatable shaft or torque tube 33.

In practice, well known switch means (not shown) is associated with the drive motor 14 to provide for selective starting or stopping thereof. Thus, the primary scan about the main axis A—A may be interrupted at will, while retaining the secondary scan. Also, suitable known motor reversal means (not shown) may be added to or incorporated in the apparatus to provide a primary reciprocatory scan about main axis A—A, instead of the above-mentioned rotary scan.

We claim:

1. A scanning antenna apparatus comprising a radiant energy reflecting structure disposed for rotation about an axis, a radiant energy feeding member constructed for cooperation with said reflecting structure and arranged to rotate with said structure about said axis and also to rotate relatively to said structure about another axis, resilient means cooperating with said radiant energy feeding member to form a mechanically resonant system in which said energy feeding member is capable of oscillation about said other axis, means coupled to said energy feeding member and responsive to the oscillation thereof to produce a signal which varies in response to the oscillations of said member, drive means coupled to said energy feeding member, and a control unit for suplying energy to said drive means, said control unit being responsive to said signal to vary the amount of energy supplied to said drive means in accordance with the variations of said signal.

2. A scanning antenna apparatus comprising a radiant energy reflecting structure disposed for rotation about an axis, a radiant energy feeding member constructed for cooperation with said reflecting structure and arranged to rotate with said structure about said axis and also to rotate relatively to said structure about another axis, resilient means cooperating with said radiant energy feeding member to form a mechanically resonant system in which said energy feeding member is capable of oscillation about said other axis, means including a first solenoid having an armature coupled to said energy feeding member to produce a signal which varies in response to the oscillations of said member, a second solenoid having an armature coupled to said energy feeding member, and a control unit responsive to said signal to supply energy to said second solenoid in phase with said signal to drive said energy feeding member.

3. A scanning antenna comprising a radiant energy reflecting structure disposed for rotational motion about an axis, a radiant energy feeding member constructed for cooperation with said reflecting structure and arranged to rotate with said structure about said axis and also to rotate relatively to said structure about another axis, resilient means cooperating with said radiant energy feeding member to form a mechanically resonant system in which said energy feeding member is capable of oscillatory motion about said other axis, means coupled to said energy feeding member and responsive to the oscillation thereof to produce a signal which varies in response to the oscillations of said member, drive means coupled to said energy feeding member, a control unit responsive to said signal to supply driving energy to said drive means in phase with said signal, and indicator-controlling means including an adjustable control element and mechanism for combining and imparting said rotary and oscillatory motions to said control element.

(References on following page)

References Cited in the file of this patent

UNITED STATES PATENTS

| | | |
|---|---|---|
| 1,568,210 | Colstad | Jan. 5, 1926 |
| 1,918,358 | Walton | July 18, 1933 |
| 2,408,825 | Varian et al. | Oct. 8, 1946 |
| 2,419,024 | Iams | Apr. 15, 1947 |
| 2,523,858 | Bodemuller | Sept. 26, 1950 |

FOREIGN PATENTS

| | | |
|---|---|---|
| 603,449 | Great Britain | June 16, 1948 |

OTHER REFERENCES

Journal of Institution of Electrical Engineers, vol. 93, part IIIA, No. 4, March-May 1946, page 630.